US00RE40348E

(19) United States
(12) Reissued Patent
Tokoro et al.

(10) Patent Number: US RE40,348 E
(45) **Date of Reissued Patent: *Jun. 3, 2008**

(54) ARC SEGMENT MAGNET, RING MAGNET AND METHOD FOR PRODUCING SUCH MAGNETS

(75) Inventors: Hisato Tokoro, Saitama-ken (JP); Kimio Uchida, Saitama-ken (JP); Kazuo Oda, Saitama-ken (JP); Tsukasa Mikamoto, Saitama-ken (JP)

(73) Assignee: Hitachi Metals, Ltd., Tokyo (JP)

( * ) Notice: This patent is subject to a terminal disclaimer.

(21) Appl. No.: 10/701,020

(22) Filed: Nov. 5, 2003

Related U.S. Patent Documents

Reissue of:
(64) Patent No.: 6,312,494
Issued: Nov. 6, 2001
Appl. No.: 09/610,476
Filed: Jul. 5, 2000

(51) Int. Cl.
*B22F 3/00* (2006.01)

(52) U.S. Cl. ..... 75/245; 419/29; 419/33; 419/36; 419/39; 148/100; 148/108; 148/301; 148/302

(58) Field of Classification Search ..... 75/245; 419/29, 33, 36, 39; 148/100, 108, 301, 302
See application file for complete search history.

(56) References Cited

U.S. PATENT DOCUMENTS 4,888,506 A * 12/1989 Umehara et al. ..... 310/13
5,489,343 A * 2/1996 Uchida et al. ..... 148/103
5,648,039 A * 7/1997 Taguchi et al. ..... 264/428
5,846,449 A * 12/1998 Taguchi et al. ..... 252/62.62
6,159,308 A * 12/2000 Uchida et al. ..... 148/302

FOREIGN PATENT DOCUMENTS

| | | |
|---|---|---|
| JP | A 6-322469 | * 11/1994 |
| JP | 6-322469 | * 11/1994 |
| JP | A 7-37716 | * 2/1995 |
| JP | 7-37716 | * 2/1995 |
| JP | A 7-57914 | * 3/1995 |
| JP | 7-57914 | * 3/1995 |
| JP | A 8-130142 | * 5/1996 |
| JP | 8-130142 | * 5/1996 |

* cited by examiner

*Primary Examiner*—Roy King
*Assistant Examiner*—Ngoclan T. Mai
(74) *Attorney, Agent, or Firm*—Sughrue Mion, PLLC

(57) ABSTRACT

A thin arc segment magnet made of [a] *an R-T-B based,* rare earth sintered magnet substantially comprising 28–33 weight % of R and 0.8–1.5 weight % of B, the balance being substantially [Fe] *T*, wherein R is at least one rare earth element including Y, and T is Fe or Fe and Co, which has an oxygen content of 0.3 weight % or less, a density of 7.56 g/cm$^3$ or more, a coercivity iHc of 1.1 MA/m (14 kOe) or more at room temperature, and an orientation $Br/4\pi I_{max}$ of 96% or more in an anisotropy-providing direction at room temperature can be produced by using a slurry mixture formed by introducing fine alloy powder of the above composition into a mixture liquid comprising 99.7–99.99 parts by weight of a mineral oil, a synthetic oil or a vegetable oil and 0.01–0.3 parts by weight of a nonionic surfactant and/or an anionic surfactant.

14 Claims, 9 Drawing Sheets

ARC SEGMENT MAGNET, RING MAGNET AND METHOD FOR PRODUCING SUCH MAGNETS

Matter enclosed in heavy brackets [ ] appears in the original patent but forms no part of this reissue specification; matter printed in italics indicates the additions made by reissue.

FIELD OF THE INVENTION

The present invention relates to a thin arc segment-shaped or ring-shaped R-T-B-based, sintered magnet having a low oxygen content and high density and orientation, and a method for producing such a sintered magnet.

BACKGROUND OF THE INVENTION

Rare earth sintered magnets put into practical use are produced by pulverization of an alloy, molding, sintering, heat treatment and machining, and further surface treatment, if necessary. Among them, R-T-B-based rare earth sintered magnets having $R_2T_{14}B$ intermetallic compounds, wherein R is at least one rare earth element including Y, and T is Fe or Fe and Co, as main phases are widely used as high-performance magnets. However, alloy powder is rapidly oxidized in the air, resulting in deterioration in magnetic properties. In extreme cases, rapid oxidation leads to ignition, posing safety problems.

Proposed as a method for preventing rapid oxidation are methods for producing a rare earth sintered magnet comprising introducing a starting material powder for the rare earth sintered magnet into a non-oxidizing mineral oil or synthetic oil, molding it in a magnetic field while preventing oxidation, and then carrying out oil removal, sintering and heat treatment in this order (see Japanese Patents 2,731,337 and 2,859,517). These methods provide sintered bodies having a low oxygen content and a high density almost equal to the theoretical density, which has remarkably improved maximum energy product $(BH)_{max}$.

Proposal was further made that remarkably improved continuous moldability is achieved by introducing the above fine alloy powder into an oil comprising a mineral oil, a synthetic oil or a vegetable oil and 0.01–0.5 weight % of oleic acid to form a starting material slurry for molding, thereby making it possible to efficiently produce a rare earth sintered magnet with improved magnetic properties (see Japanese Patent Laid-Open No. 8-130142).

However, the rare earth sintered magnets produced by the above methods have magnetic properties such as $(BH)_{max}$ that are not so high as expected by the inventors, as shown in COMPARATIVE EXAMPLES described later, and further improvement in performance has been difficult. Also, when a thin (or thin and long), arc-segment-shaped green body for a rare earth sintered magnet is formed by compression molding in a magnetic field by the above conventional methods, remarkable cracking occurs. Further, the above thin (or thin and long) green body for a rare earth sintered magnet has an extremely uneven density distribution, resulting in largely deformed sintered bodies due to locally large differences in density. This leads to large deformation of the sintered bodies in an anisotropy-providing direction, resulting in decrease in orientation and thus failure to put them into practical use. Thus, these conventional methods fail to sufficiently satisfy the recent demand of making magnet products thinner, smaller and higher in performance. The term "thin" used herein means that the thickness of a magnet is as small as 4 mm or less, and the term "long" means that the axial length of a magnet is as large as 40 mm or more.

Japanese Patent Laid-Open No. 7-37716 discloses in EXAMPLE 2 that an alloy having a composition of $Nd_{12.8}Fe_{bal.}Co_{4.5}B_{6.2}Ga_{0.1}$ (at. %) is finely pulverized to an average particle size of 5 μm, and that the resultant fine powder is mixed with an mineral oil and then subjected to molding in a transverse magnetic field under the conditions of an extremely high orientation magnetic field of 2.0 MA/m (25 kOe) and an extremely low molding pressure of 16.7 MPa (0.17 ton/cm$^2$) without contact with the air, to provide an R-T-B-based sintered magnet with high magnetic properties of iHc=1.1 MA/m (14.1 kOe), $(BH)_{max}$=398.8 kJ/m$^3$ (50.1 MGOe), orientation=96%, and I(105)/I(006)=1.32.

However, when thin (or thin and long) green bodies for arc-segment-shaped, R-T-B-based sintered magnets are formed by compression molding in a magnetic field under the conditions described in EXAMPLE 12 of Japanese Patent Laid-Open No. 7-37716, remarkable cracking occurs. Even when green bodies without cracking are obtained, they have an extremely uneven density distribution, resulting in largely deformed sintered bodies, leading to largely deformed sintered bodies poor in orientation, and cannot be put into practical use.

When radially anisotropic, R-T-B-based, sintered ring magnets (hereinafter referred to as radial rings) or arc segment magnets are formed under the conventional production conditions described in Japanese Patent 2,859,517, a radially orienting magnetic field should be applied from the inner surface side to the outer surface side of a cavity of a molding die in the course of molding to impart radial anisotropy to the green bodies, posing the problem that the smaller the inner diameter of a cavity, the weaker the radially orienting magnetic field. Thus, the smaller the inner diameters of radial rings, the poorer the radial orientation of green bodies. In actuality, if an orientation (static) magnetic field of more than 795.8 kA/m (10 kOe) can be applied in a radial direction for several seconds, it would be possible to obtain substantially the same level of radial orientation as the orientation of R-T-B-based sintered magnets formed though a molding step in a transverse magnetic field or a vertical magnetic field. However, in the industrial production of radial rings of 10–100 mm in inner diameter, the radially orienting magnetic field applied at the time of molding is as low as about 238.7–795.8 kA/m (3–10 kOe).

As shown in COMPARATIVE EXAMPLE 7 in Table 6, when a radial ring of 100 mm or less in inner diameter is produced using a starting material slurry described in Japanese Patent 2,859,517, high orientation cannot be achieved. As a result of investigation of these causes, the inventors have found that this is caused by poor radial orientation of green bodies.

Also, a radially orienting magnetic field applied during a molding step of radially anisotropic, R-T-B-based, sintered arc segment magnets in usual industrial production is as low as about 238.7–795.8 KA/m (3–10 kOe). Thus, like radial rings, the problem of poor radial orientation occurs in the case of R-T-B-based, sintered arc segment magnets of 100 mm or less in inner diameter.

OBJECT OF THE INVENTION

Accordingly, an object of the present invention is to provide a thin (or thin and long), R-T-B-based, sintered arc segment magnet having a low oxygen content and high density and orientation.

Another object of the present invention is to provide a radially anisotropic, R-T-B-based, sintered ring magnet having a low oxygen content and high density and orientation.

A further object of the present invention is to provide a method for producing a rare earth sintered magnet having a low oxygen content and high density and orientation.

SUMMARY OF THE INVENTION

The thin arc segment magnet having a thickness of 1–4 mm according to one embodiment of the present invention is made of [a] *an R-T-B-based,* rare earth sintered magnet having a main component composition comprising 28–33 weight % of R and 0.8–1.5 weight % of B, the balance being substantially [Fe] *T*, wherein R is at least one rare earth element including Y, and T is Fe or Fe and Co, the arc segment magnet having an oxygen content of 0.3 weight % or less based on the total weight of the magnet, a density of 7.56 g/cm$^3$ or more, a coercivity iHc of 1.1 MA/m (14 kOe) or more at room temperature, and an orientation $Br/4\pi I_{max}$ of 96% or more in an anisotropy-providing direction at room temperature.

This arc segment magnet preferably has parallel anistropy and a length of 40–100 mm in an axial direction. Further, the ratio I(105)/I(006) is preferably 0.5–0.8, wherein I(105) represents the intensity of an X-ray diffraction peak from a (105) plane, and I(006) represents the intensity of an X-ray diffraction peak from a (106) plane.

The radially anisotropic arc segment magnet having an inner diameter of 100 mm or less according to another embodiment of the present invention is made of [a] *an R-T-B-based,* rare earth sintered magnet having a main component composition comprising 28–33 weight % of R and 0.8–1.5 weight % of B, the balance being substantially [Fe] *T*, wherein R is at least one rare earth element including Y, and T is Fe or Fe and Co, the arc segment magnet having an oxygen content of 0.3 weight % or less based on the total weight of the magnet, a density of 7.56 g/cm$^3$ or more, a coercivity iHc of 1.1 MA/m (14 kOe) or more at room temperature, and an orientation $[Br///(Br//+Br\perp)]\times 100$ (%) of 85.5% or more at room temperature, the orientation being defined by a residual magnetic flux density Br// in a radial direction and a residual magnetic flux density Br⊥ in an axial direction perpendicular to the radial direction.

This arc segment magnet is preferably as thin as 1–4 mm and as long as 40–100 mm in the axial direction.

The radially anisotropic ring magnet having an inner diameter of 100 mm or less according to a further embodiment of the present invention is made of [a] *an R-T-B-based,* rare earth sintered magnet having a main component composition comprising 28–33 weight % of R and 0.8–1.5 weight % of B, the balance being substantially [Fe] *T*, wherein R is at least one rare earth element including Y, and T is Fe or Fe and Co, the ring magnet having an oxygen content of 0.3 weight % or less based on the total weight of the magnet, a density of 7.56 g/cm$^3$ or more, a coercivity iHc of 1.1 MA/m (14 kOe) or more at room temperature, and an orientation $[Br///(Br//+Br\perp)]\times 100$ (%) of 85.5% or more at room temperature, the orientation being defined by a residual magnetic flux density Br// in a radial direction and a residual magnetic flux density Br⊥ in an axial direction perpendicular to the radial direction. *The ring magnet preferably has portions bonded by sintering.*

The method for producing [a] *an R-T-B-based,* rare earth sintered magnet according to the present invention comprises the steps of finely pulverizing an alloy for the *R-T-B-based,* rare earth sintered magnet to an average particle size of 1–10 μm in a non-oxidizing atmosphere; introducing the resultant fine powder into a mixture liquid comprising 99.7–99.99 parts by weight of at least one oil selected from the group consisting of a mineral oil, a synthetic oil and a vegetable oil and 0.01–0.3 parts by weight of a nonionic surfactant and/or an anionic surfactant; subjecting the resultant slurry mixture to molding in a magnetic field; and carrying out oil removal, sintering and heat treatment in this order. The *R-T-B-based,* rare earth sintered magnet preferably has a main phase composed of an $R_2T_{14}B$ intermetallic compound, wherein R is at least one rare earth element including Y, and T is Fe or Fe and Co. The molding in a magnetic field is preferably compression molding, and the compressed green body preferably has a density distribution of 4.3–4.7 g/cm$^3$.

DETAILED DESCRIPTION OF THE PREFERRED EMBODIMENTS

Figure 1:
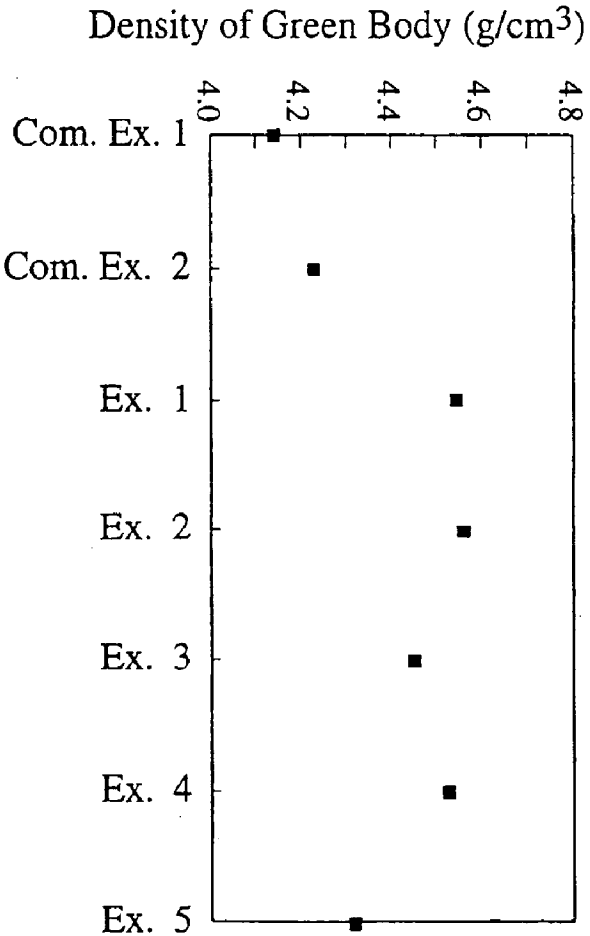
FIG. 1 is a graph showing the relation between the type of a surfactant added to a slurry and the density of a green body formed from the slurry.

[1] Composition of Rare Earth Sintered Magnet

The preferred rare earth sintered magnets for the arc segment magnet and the ring magnet of the present invention are rare earth sintered magnets having $R_2T_{14}B$-type intermetallic compounds as main phases. These rare earth sintered magnets are called $R_2T_{14}B$-type, sintered magnets.

(A) First $R_2T_{14}B$-type, Sintered Magnet

The preferred composition of the first $R_2T_{14}B$-type, sintered magnet comprises 28–33 weight % of R and 0.8–1.5 weight % of B, the balance being substantially [Fe] *T*, wherein R is at least one rare earth element including Y, and T is Fe or Fe and Co.

To achieve good magnetic properties and orientation, the amount of R is 28–33 weight %, preferably 28–32 weight %, more preferably 28–31 weight %. When the amount of R is less than 28 weight %, the desired iHc cannot be obtained. On the other hand, when the amount of R exceeds 33 weight %, the desired orientation cannot be obtained. To obtain the desired iHc and orientation, R is preferably Nd+Dy or Nd+Dy+Pr, and the amount of Dy is preferably 0.3–10 weight %, more preferably 0.5–8 weight % based on the total weight of the magnet. When the amount of Dy is less than 0.3 weight %, sufficient effects of adding Dy cannot be obtained. On the other hand, when it exceeds 10 weight %, Br decreases, resulting in failure to obtain the desired orientation.

The amount of B is 0.8–1.5 weight %, preferably 0.85–1.2 weight %. When the amount of B is less than 0.8 weight %, it is difficult to obtain iHc of 1.1 MA/m (14 kOe) or more. On the other hand, when the amount of B is more than 1.5 weight %, the desired orientation cannot be obtained.

T is Fe or Fe+Co. The inclusion of Co improves corrosion resistance and elevates the Curie temperature, thereby improving the heat resistance of the $R_2T_{14}B$-type, sintered magnet. However, when the amount of Co exceeds 5 weight % based on the total weight of the magnet, Fe—Co phases harmful to magnetic properties are formed, resulting in a drastic decrease in Br and iHc. Accordingly, the amount of Co is preferably 5 weight % or less. On the other hand, when the amount of Co is less than 0.5 weight %, effects of improving corrosion resistance and heat resistance cannot be obtained. Accordingly, the amount of Co is preferably 0.5–5 weight %.

The amount of oxygen contained as an inevitable impurity is 0.3 weight % or less, preferably 0.2 weight % or less, more preferably 0.18 weight % or less, based on the total weight of the magnet. With an oxygen content reduced to 0.3 weight % or less, the density of a sintered body can be increased to a level extremely close to the theoretical density, specifically the sintered body density of 7.56 g/cm$^3$ or more can stably be obtained. Further, by properly selecting the compositions of main components, the average particle size of fine powder and sintering temperature, etc., it is possible to achieve the sintered body density of 7.58 g/cm$^3$ or more, further 7.59 g/cm$^3$ or more.

The amount of carbon contained as an inevitable impurity is preferably 0.10 weight % or less, more preferably 0.07 weight % or less, based on the total weight of the magnet. The reduction of the carbon content suppresses the formation of rare earth carbides, resulting in an increase in iHc, $(BH)_{max}$, etc.

The amount of nitrogen contained as an inevitable impurity is preferably 0.15 weight % or less, based on the total weight of the magnet. When the nitrogen content exceeds 0.15 weight %, Br decreases drastically. Incidentally, the lower limit of the nitrogen content is practically about 0.002 weight %. A surface treatment coating such as Ni plating, etc., is formed on the arc segment magnet and the ring magnet, and good corrosion resistance is achieved when the nitrogen content is 0.15 weight % or less.

In the case of using R-T-B alloys produced by a reduction diffusion method using Ca as a reducing agent, the amount of Ca is reduced to preferably 0.1 weight % or less, more preferably 0.03 weight % or less, based on the total weight of the magnet, to obtain the desired iHc and orientation.

(B) Second $R_2T_{14}B$-type, Sintered Magnet

The preferred composition of the second $R_2T_{14}B$-type, sintered magnet comprises 28–33 weight % of R, 0.8–1.5 weight % of B, and 0.6 weight % of $M_1$, the balance being substantially [Fe] *T*, wherein R and T are the same as in the first $R_2T_{14}B$-type, sintered magnet, and $M_1$ is at least one element selected from the group consisting of Nb, Mo, W, V, Ta, Cr, Ti, Zr and Hf. Because the second $R_2T_{14}B$-type, sintered magnet is the same as the first $R_2T_{14}B$-type, sintered magnet except for $M_1$, explanation will be made only on $M_1$ here.

The amount of a high-melting-point metal element $M_1$ is 0.6 weight % or less, preferably 0.01–0.6 weight %, to increase magnetic properties. With 0.6 weight % or less of $M_1$, the excess growth of main phase crystal grains is suppressed during the sintering process, thereby making it possible to stably achieve iHc of 1.1 MA/m (14 kOe) or more. However, when the $M_1$ content exceeds 0.6 weight %, the normal growth of main phase crystal grains is rather hindered, resulting in decrease in Br. On the other hand, when the $M_1$ content is less than 0.01 weight %, effects of $M_1$ improving magnetic properties cannot be obtained.

(C) Third $R_2T_{14}B$-type, sintered magnet

The preferred composition of the third $R_2T_{14}B$-type, sintered magnet comprises 28–33 weight % of R, 0.8–1.5 weight % of B, 0.6 weight % of $M_1$, and 0.01–0.4 weight % of $M_2$, the balance being substantially [Fe] *T*, wherein R, T and $M_1$ are the same as in the second $R_2T_{14}B$-type, sintered magnet, and $M_2$ is at least one selected from the group consisting of Al, Ga and Cu. Because the third $R_2T_{14}B$-type, sintered magnet is the same as the second $R_2T_{14}B$-type, sintered magnet except for $M_2$, explanation will be made only on $M_2$ here.

The amount of $M_2$ is 0.01–0.4 weight %. With respect to each element, the inclusion of Al contributes to increase iHc, resulting in improvement in corrosion resistance. When the amount of Al is more than 0.3 weight %, Br decreases drastically. On the other hand, when the amount of Al is less than 0.01 weight %, effects of improving iHc and corrosion resistance cannot be obtained. The inclusion of Ga contributes to remarkably increase iHc. When the amount of Ga is more than 0.3 weight %, Br decreases drastically. On the other hand, when the amount of Ga is less than 0.01 weight %, effects of improving iHc cannot be obtained. The inclusion of a trace amount of Cu contributes to improvement in corrosion resistance and increase in iHc. When the amount of Cu is more than 0.3 weight %, Br decreases drastically. On the other hand, when the amount of Cu is less than 0.01 weight %, effects of improving corrosion resistance and iHc cannot be obtained. When two or more of Al, Ga and Cu are contained, the amount of $M_2$ is their total amount.

(D) Other Rare Earth Sintered Magnet

In addition to the $R_2T_{14}B$-type, sintered magnets, the rare earth sintered magnets usable in the present invention may be $SmCo_5$ or $Sm_2TM_{17}$, wherein TM comprises Co, Fe, Cu and M', and M' is at least one selected from the group consisting of Zr, Hf, Ti and V.

[2] Arc Segment Magnet

The first arc segment magnet of the present invention has an oxygen content of 0.3 weight % or less based on the total weight of the magnet, a density of 7.56 g/cm$^3$ or more, a coercivity iHc of 1.1 MA/m (14 kOe) or more at room temperature, and an orientation $Br/4\pi I_{max}$ of 96% or more in an anisotropy-providing direction at room temperature.

Here, $4\pi I_{max}$ is the maximum value of $4\pi I$ in a curve of $4\pi I$-H, wherein $4\pi I$ is the intensity of magnetization, H is the intensity of a magnetic field, and Br is the residual magnetic flux density.

The first arc segment magnet is preferably as thin as 1–4 mm. When the thickness of the arc segment magnet is less than 1 mm, deterioration in magnetic properties is remarkable in a high-temperature environment, resulting in poor practicality. On the other hand, when the thickness of the arc segment magnet is more than 4 mm, it is difficult to meet the recent demand of making magnet products thinner, smaller and higher in performance. The thickness of the arc segment magnet is preferably 1–3 mm, more preferably 1–2 mm.

From the aspect of practicality, the arc segment magnet preferably has parallel anisotropy, and the arc segment magnet preferably has a center angle of 20–180°. The axial length of the arc segment magnet is preferably 40–100 mm, more preferably 50–100 mm, particularly 60–100 mm. Also, it preferably has a ratio I(105)/(006) of 0.5–0.8, wherein I(105) represents the intensity of an X-ray diffraction peak from a (105) plane, and I(006) represents the intensity of an X-ray diffraction peak from a (106) plane.

The second arc segment magnet of the present invention has radial anisotropy, with an inner diameter of 100 mm or less, preferably 50 mm or less. The orientation [Br///(Br//+Br)]×100 (%), which is defined by a residual magnetic flux density Br// is a radial direction and a residual magnetic flux density Br in an axial direction perpendicular to the radial direction, is 85.5% or more, preferably 86.5% or more, at room temperature.

The first and second arc segment magnets meeting the above conditions have high iHc and orientation even with small radii of curvature.

[3] Ring Magnet

The radially anisotropic ring magnet of the present invention has an oxygen content of 0.3 weight % or less based on the total weight of the magnet, a density of 7.56 g/cm$^3$ or more, a coercivity iHc of 1.1 MA/m (14 kOe) or more at room temperature, and an orientation [Br///(Br//+Br)]×100 (%) of 85.5% or more at room temperature. The orientation is defined by a residual magnetic flux density Br// in a radial direction and a residual magnetic flux density Br in an axial direction perpendicular to the radial direction. The inner diameter of the ring magnet is 100 mm or less, preferably 50 mm or less. From the aspect of practicality, the ring magnet preferably has portions bonded by sintering.

The ring magnet meeting the above conditions has high iHc and orientation even with a small radius of curvature.

[4] Production Method of Rare Earth Sintered Magnet

The method for producing [a] *an R-T-B-based,* rare earth sintered magnet according to the present invention comprises the steps of finely pulverizing an alloy for the rare earth sintered magnet to an average particle size of 1–10 μm in a non-oxidizing atmosphere; introducing the resultant fine powder into a mixture liquid comprising 99.7–99.99 parts by weight of at least one oil selected from the group consisting of a mineral oil, a synthetic oil and a vegetable oil and 0.01–0.3 parts by weight of a nonionic surfactant and/or an anionic surfactant; subjecting the resultant slurry mixture to molding in a magnetic field; and carrying out oil removal, sintering and heat treatment in this order.

(A) Fine Pulverization

The fine pulverization of an alloy is carried out by a dry pulverization method or a wet pulverization method. The dry pulverization method is carried out by a jet mill, etc., in an inert gas atmosphere having an oxygen concentration of 0.1% by volume or less, preferably 0.01% by volume. The wet pulverization method is carried out by a wet ball mill, etc., under the non-oxidizing condition.

The average particle size of fine powder is preferably 1–10 μm, more preferably 3–6 μm. When the average particle size is less than 1 μm, pulverization efficiency of fine powder is extremely low. On the other hand, when it exceeds 10 μm, iHc and orientation are drastically decreased.

(B) Forming Slurry

After fine pulverization, the fine powder is introduced from an inert gas atmosphere directly into a mixture liquid comprising 99.7–99.99 parts by weight of at least one oil selected from the group consisting of a mineral oil, a synthetic oil and a vegetable oil and 0.01–0.3 parts by weight of a nonionic surfactant and/or an anionic surfactant without contact with the air, thereby forming a slurry. During this step, the fine powder is prevented from being brought into contact with the air, thereby substantially avoiding oxidation and water adsorption.

The surfactants usable in the present invention include nonionic surfactants and anionic surfactants. These surfactants may be used alone or in combination.

The nonionic surfactants useful in the present invention include polyethylene glycol-type surfactants and polyvalent alcohol-type surfactants. The polyethylene glycol-type surfactants may be ethylene oxide adducts of higher alcohols, alkyl phenols, aliphatic acids, polyvalent alcohol-aliphatic acid esters, higher alkyl amines, aliphatic acid amides, oils and fats, polypropylene glycol, etc. The polyvalent alcohol-type surfactants may be aliphatic acid esters of glycerol, pentacrythritol, sorbitol, sorbitan, sucrose, etc., alkyl ethers of polyvalent alcohols, aliphatic acid amides of alkanolamines, etc. Among them, ethylene oxide adducts of higher alkyl amines, aliphatic acid esters of glycerol, aliphatic acid esters of sorbitol, aliphatic acid esters of sorbitan, and alkyl ethers of polyvalent alcohols are preferable.

The anionic surfactants useful in the present invention include, for instance, special macromolecular surfactants and special polycarboxylic acid-type, macromolecular surfactants.

(C) Molding in a Magnetic Field

The slurry is molded in a magnetic field. The molding of an arc segment magnet in a magnetic field includes a molding method in a vertical magnetic field, in which the compression direction is substantially parallel with the magnetic field direction, a molding method in a transverse magnetic field, in which the compression direction is substantially perpendicular to the magnetic field direction, and a molding method in a radial magnetic field. The orientation tends to be smaller from the molding in a transverse magnetic field to the molding in a vertical magnetic field and to the molding in a radial magnetic field. The molding method in a magnetic field is preferably a compression-molding method, and the compressed green body preferably has a density distribution of 4.3–4.7 g/cm$^3$. To prevent deterioration in magnetic properties due to the oxidation of a green body, the green body is preferably kept in an oil immediately after molding, until it is subjected to oil removal.

(D) Oil Removal

If the green body is rapidly heated from room temperature to a sintering temperature, oil remaining in the green body reacts with rare earth elements to form rare earth carbides, resulting in deterioration in magnetic properties. Thus, it is preferable to carry out an oil removal treatment by heating the green body at a temperature of 100–500° C. and a vacuum degree of 13.3 Pa ($10^{-1}$ Torr) or less for 30 minutes or longer. By this oil removal treatment, oil remaining in the green body is fully removed. Incidentally, as long as the oil removal treatment is within a temperature range of 100–500° C., it need not be conducted by a single step, but may be conducted by a plurality of steps. Also, oil removal can be efficiently carried out when a temperature-elevating speed from room temperature to 500° C. is preferably 10° C./minute or less, more preferably 5° C./minute or less.

From the aspect of oil removal and moldability, mineral oils, synthetic oils, vegetable oils or mixtures thereof preferably have fractional distillation points of 350° C. or lower. With respect to kinetic viscosity at room temperature, it is preferably 10 cSt or less, more preferably 5 cSt or less.

(E) Sintering and Heat Treatment

The sintering and heat treatment conditions of the oil-removed green body may be the same as those used for usual rare earth sintered magnets.

The present invention will be described in further detail referring to the following Examples without intention of limiting the present invention thereto.

EXAMPLE 1

Coarse alloy powder comprising 22.6 weight % of Nd, 6.3 weight % of Pr, 1.3 weight % of Dy, 1.0 weight % of B, 0.2 weight % of Nb, 0.15 weight % of Al, 2.0 weight % of Co, 0.08 weight % of Ga, and 0.1 weight % of Cu, based on the total weight of the alloy, the balance being substantially Fe and inevitable impurities was prepared, and finely pulverized by a jet mill in a nitrogen gas atmosphere having an oxygen concentration of 10 ppm by volume or less. The resultant fine powder having an average particle size of 4.0 μm was directly introduced into a mineral oil (tradename "Idemitsu Supper Sol PA-30" available from Idemitsu Kosan Co., Ltd.) containing an aliphatic acid ester of glycerol (oleic acid monoglyceride, tradename "Emasol MO-50" available from Kao Corp.) in the nitrogen gas atmosphere without contact with the air, to form a slurry. The resultant slurry had a composition of 70 parts by weight of fine powder, 29.93 parts by weight of mineral oil, and 0.06 parts by weight of the aliphatic acid ester of glycerol.

This slurry was charged into a cavity of a molding die to carry out compression molding under the conditions of a transverse orienting magnetic field having an intensity of 1.0 MA/m (13 kOe) and molding pressure of 98 MPa (1.0 ton/cm$^2$), thereby producing a rectangular plate-shaped green body with anisotropy in a thickness direction. This green body was heated at 200° C. for 1 hour at a vacuum degree of about 66.5 Pa ($5\times10^{-1}$ Torr) to remove oil. It was then sintered at 1070° C. for 2 hours at a vacuum degree of about $4.0\times10^{-3}$ Pa (about $3\times10^{-5}$ Torr), and then cooled to room temperature. The resultant sintered body was subjected to a heat treatment comprising heating at 900° C. for 2 hours in an Ar atmosphere, cooling to 480° C., keeping at 480° C. for 1 hour, cooling to 460° C., keeping at 460° C. for 1 hour and then cooling to room temperature, to obtain a rectangular plate-shaped, R-T-B-based, sintered magnet.

The above sintered body was machined to a desired shape, and then coated with an epoxy resin at an average thickness of 15 μm. In a pulse magnetic field of 11.9 MA/m (150 kOe) at room temperature (20° C.), magnetic properties were measured in a magnetic anisotropy-providing direction. Here, "magnetic anisotropy-providing direction" means a direction in which the magnet shows the highest residual magnetic flux density Br. Measurement was also conducted on density and oxygen content. The measurement results are shown in Table 1.

EXAMPLES 2, 3

R-T-B-based, sintered magnets were produced in the same manner as in EXAMPLE 1 except for using a nonionic surfactant (polyoxyethylene alkyl amine, tradename "Amiet 105," available from Kao Corp.) in EXAMPLE 2, and a nonionic surfactant (sorbitan trioleate, tradename "Rheodol SP-O30," available from Kao Corp.) in EXAMPLE 3 to measure their magnetic properties, density and oxygen content. The measurement results are shown in Table 1.

EXAMPLES 4, 5

R-T-B-based, sintered magnets were produced in the same manner as in EXAMPLE 1 except for using an anionic surfactant (special macromolecular surfactant, tradename "Homogenol L-95," available from Kao Corp.) in EXAMPLE 4, and an anionic surfactant (special polycarboxylic acid-type, macromolecular surfactant, tradename "Homogenol L-18," available from Kao Corp.) in EXAMPLE 5, to measure their magnetic properties, density and oxygen content. The measurement results are shown in Table 1.

Comparative Example 1

R-T-B-based, sintered magnets were produced in the same manner as in EXAMPLE 1 except for using a slurry comprising the above fine powder and a mineral oil without containing a surfactant, to measure their magnetic properties, density and oxygen content. The measurement results are shown in Table 1.

Comparative Example 2

R-T-B-based, sintered magnets were produced in the same manner as in EXAMPLE 1 except for using a slurry comprising the fine powder of EXAMPLE 1, a mineral oil and 0.04 weight %, based on the total weight of the fine powder, of oleic acid (the concentration of fine powder in the slurry: about 70%), to measure their magnetic properties, density and oxygen content. The measurement results are shown in Table 1.

TABLE 1

| No. | Surfactant | Br/ $4\pi I_{max}$ (%) | iHc (MA/m) (kOc) | $(BH)_{max}$ (kJ/m$^3$) (MGOc) | Density (g/cm$^3$) | Oxygen (wt. %) |
|---|---|---|---|---|---|---|
| Ex. 1 | Oleic Acid Monoglyceride | 96.7 | 1.22 15.3 | 396 49.7 | 7.60 | 0.14 |
| Ex. 2 | Polyoxy-ethylene Alkyl Amine | 97.1 | 1.21 15.2 | 393 49.4 | 7.59 | 0.14 |
| Ex. 3 | Sorbitan Trioleate | 97.1 | 1.21 15.2 | 391 49.1 | 7.59 | 0.14 |
| Ex. 4 | Special Macro-molecular Surfactant | 96.9 | 1.17 14.7 | 391 49.1 | 7.59 | 0.14 |
| Ex. 5 | Polycarboxylic Acid-Type Surfactant* | 96.1 | 1.19 15.0 | 389 48.9 | 7.59 | 0.14 |
| Com. Ex. 1 | No | 95.1 | 1.23 15.5 | 377 47.4 | 7.60 | 0.12 |
| Com. Ex. 2 | Oleic Acid | 95.6 | 1.00 12.6 | 357 44.9 | 7.60 | 0.18 |

Note
*Special polycarboxylic acid-type, macromolecular surfactant.

It is clear from Table 1 that each sintered magnet of EXAMPLES 1–3 formed from a slurry containing a nonionic surfactant and each sintered magnet of EXAMPLES 4 and 5 formed from a slurry containing an anionic surfactant had improved $Br/4\pi I_{max}$ and $(BH)_{max}$ over those of the sintered magnet of COMPARATIVE EXAMPLE 1 formed from a slurry containing no surfactant, with substantially the same iHc.

Though the sintered magnet of COMPARATIVE EXAMPLE 2 formed from a slurry containing oleic acid had improved Br/4πImax over that of the sintered magnet of COMPARATIVE EXAMPLE 1, the sintered magnet of COMPARATIVE EXAMPLE 2 was poorer than those of the above EXAMPLES not only in $Br/4\pi I_{max}$ but also in iHc. This is due to the fact that the amount of the remaining carbon was as high as 0.11% in the sintered magnets of COMPARATIVE EXAMPLE 2.

Incidentally, the carbon content in each sintered magnet in each EXAMPLE and COMPARATIVE EXAMPLE 1 was in a range of 0.06–0.07 weight %, with no significant difference. Also, the nitrogen content in each EXAMPLE and each COMPARATIVE EXAMPLE was in a range of 0.02–0.03 weight %, with no significant difference.

FIG. 1 shows a typical density ρg of each green body in EXAMPLES 1–5 and COMPARATIVE EXAMPLES 1 and 2. It is clear from FIG. 1 that the density ρg of each green body is higher in EXAMPLES 1–5 than in COMPARATIVE EXAMPLES 1 and 2.

Figure 2:
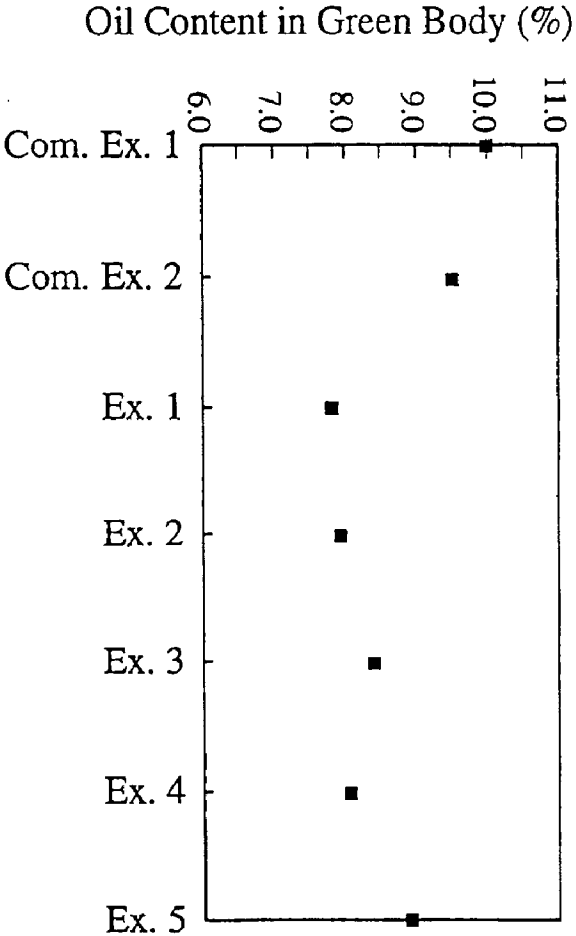
FIG. 2 is a graph showing the relation between the type of a surfactant added to a slurry and the oil content in a green body formed from the slurry.

FIG. 2 shows a typical oil content of each green body in EXAMPLES 1–5 and COMPARATIVE EXAMPLES 1 and 2. The oil content is defined by [(weight of green body−weight of sintered body)/weight of green body]×100 (%). It is clear from FIG. 2 that the oil content of each green body is smaller in EXAMPLES 1–5 than in COMPARATIVE EXAMPLES 1 and 2. Decrease in oil content means the reduction of load for an oil removal treatment.

Figure 3:
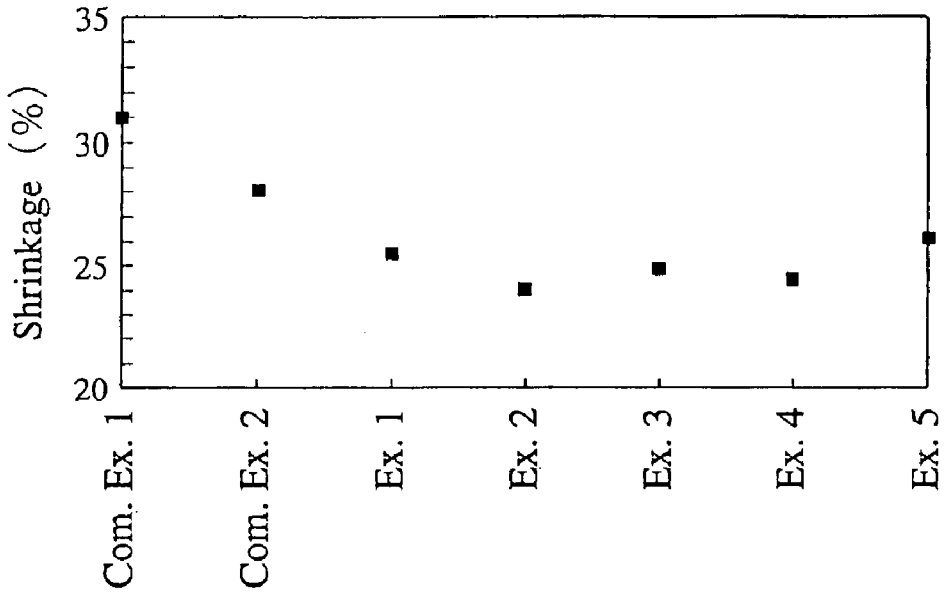
FIG. 3 is a graph showing the relation between the type of a surfactant added to a slurry and the shrinkage ratio of a green body formed from the slurry.

FIG. 3 shows a shrinkage ratio of each sintered body in an anisotropy-providing direction in EXAMPLES 1–5 and COMPARATIVE EXAMPLES 1 and 2. The shrinkage ratio is defined by [(average thickness of green body−average thickness of sintered body)/average thickness of green body]×100 (%). It is clear from FIG. 3 that the shrinkage ratio in a thickness direction is as small as 24–26% in EXAMPLES 1–5, while the shrinkage ratio in a thickness direction is as large as 28–31% in COMPARATIVE EXAMPLES 1 and 2. Thus, a near-net-shaped sintered body having a shrinkage ratio of less than 28% in an anisotropy-providing direction can be obtained according to the present invention.

EXAMPLE 6

Figure 4:
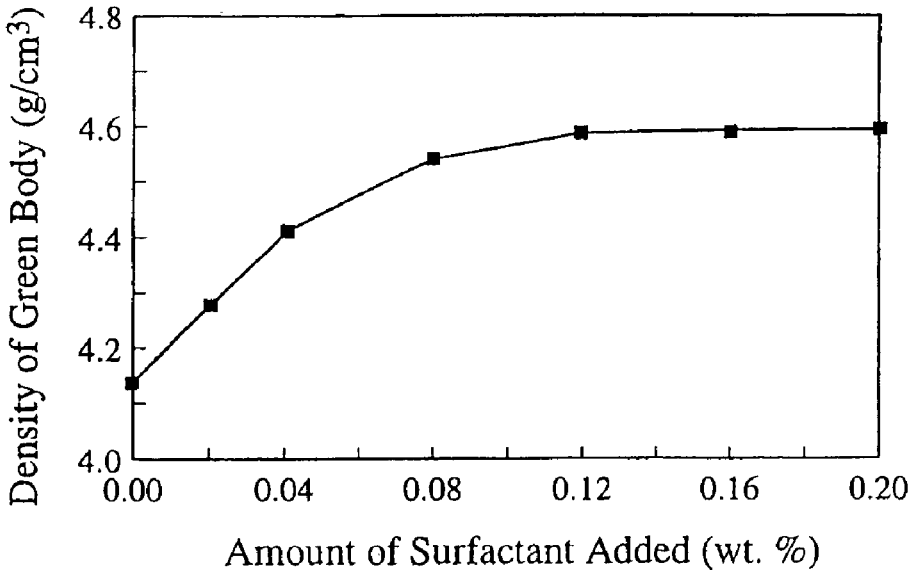
FIG. 4 is a graph showing the relation between the amount of a surfactant added and the density of a green body.

Compression molding in a transverse magnetic field was carried out in the same manner as in EXAMPLE 1 except for changing the amount of an aliphatic acid ester of glycerol (fine powder+aliphatic acid ester of glycerol=100 weight %), to produce a green body. The density ρg of each green body is shown in FIG. 4 It is clear from FIG. 4 that the density ρg increases in proportion to the amount of an aliphatic acid ester of glycerol added, and the density ρg is almost saturated when the amount of an aliphatic acid ester of glycerol reaches 0.2 weight %. Also, when the amount of an aliphatic acid ester of glycerol is 0.01–0.3 weight %, the orientation $Br/4\pi I_{max}$ is an anisotropy-providing direction is enhanced. When the amount of an aliphatic acid ester of glycerol is less than 0.01 weight %, sufficient effects of its addition cannot be obtained. Accordingly, the amount of an aliphatic acid ester of glycerol is preferably 0.01–0.3 weight %, more preferably 0.01–0.2 weight % in the R-T-B-based, sintered magnet fonned through molding in a transverse magnetic field.

Figure 5:
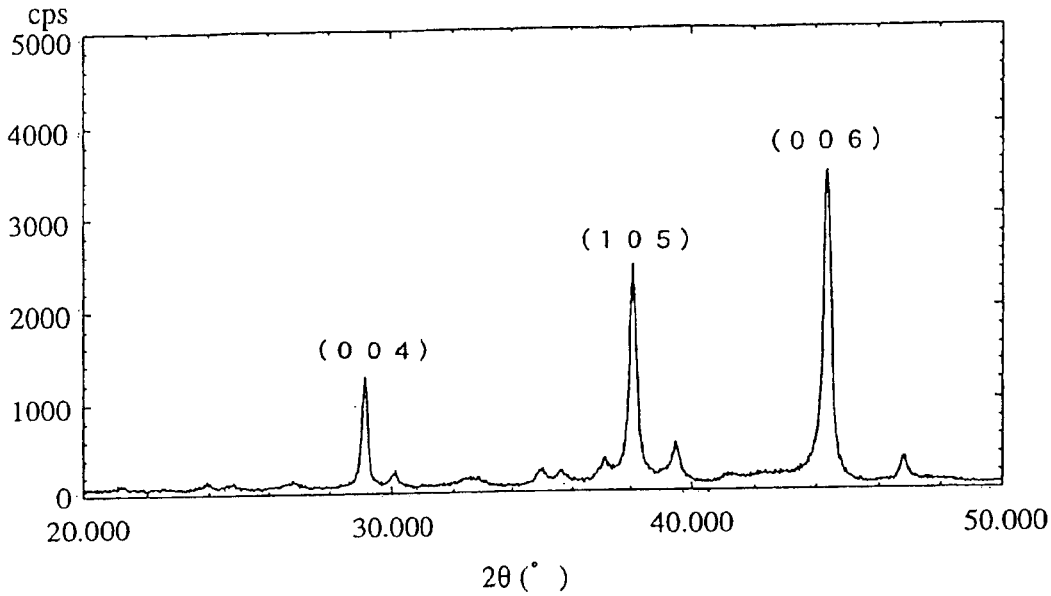
FIG. 5 is a graph showing an X-ray diffraction pattern of the R-T-B-based, sintered magnet in EXAMPLE 1.

A sample for X-ray diffraction measurement was cut out of the R-T-B-based, sintered magnet of EXAMPLE 1, and set in an X-ray diffraction apparatus (RU-200BH, available from Rigaku Denki K. K.) for X-ray diffraction measurement by a 2θ-θ scanning method. The results are shown in FIG. 5. CuKα1 ray (λ=0.15405 nm) was used as an X-ray source. As is clear from FIG. 5, main diffraction peaks were obtained from a (004) plane at 2θ=29.08°, a (105) plane at 2θ=38.06°, and a (006) plane at 2θ=44.34° in the $R_2T_{14}B$-type intermetallic compound as a main phase. Assuming that the intensity I(106) of an X-ray diffraction peak from a (006) plane was 100%, I(004)/I(006)=0.33, and I(105)/I(006)=0.63.

Figure 6:
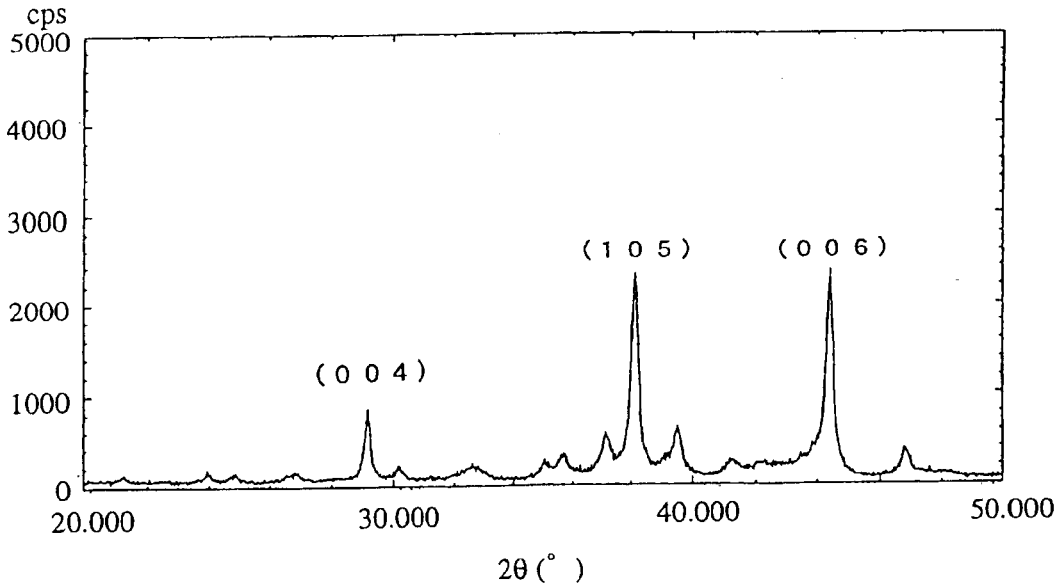
FIG. 6 is a graph showing an X-ray diffraction pattern of the R-T-B-based, sintered magnet in COMPARATIVE EXAMPLE 1.

Next, a sample for X-ray diffraction measurement was cut out of the R-T-B-based, sintered magnet of COMPARATIVE EXAMPLE 1, and X-ray diffraction measurement was carried out in the same manner as in EXAMPLE 1. The results are shown in FIG. 6. Main diffraction peaks in FIG. 6 are the same as in FIG. 5, and I(004)/I(006)=0.32, and I(105)/I(006)=0.96.

The same X-ray diffraction measurement was carried out on each R-T-B-based, sintered magnet of EXAMPLES 2–5 and COMPARATIVE EXAMPLE 2. As a result, the samples of EXAMPLES 2–5 showed I(105)/I(006)=0.50–0.80, and the sample of COMPARATIVE EXAMPLE 2 showed I(105)/I(006)=0.91.

EXAMPLE 7

Figure 9:
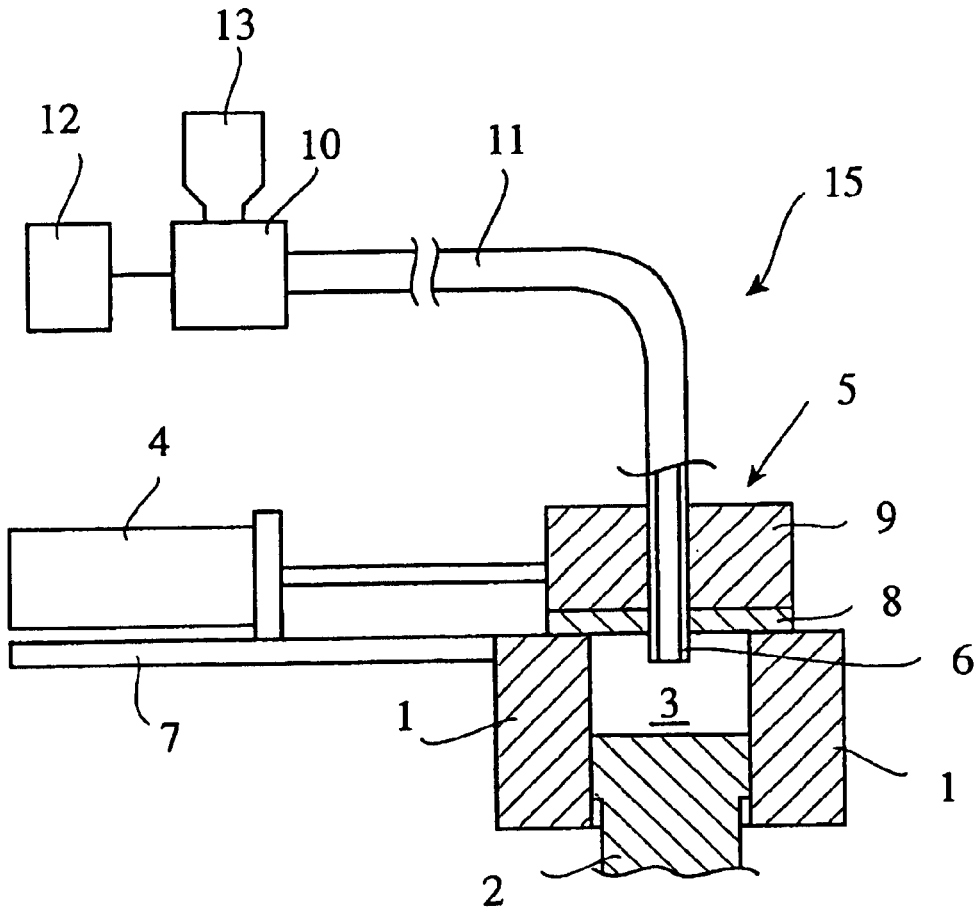
FIG. 9 is a partial cross-sectional view showing one example of a slurry-supplying apparatus used in the present invention.

Preparation and Evaluation of R-T-B-based Sintered Arc Segment Magnet Having Parallel Anisotropy The supply and molding in a magnetic field of a slurry was carried out by using an apparatus 15 shown in FIG. 9, which comprises a die 1, a lower punch 2, a cavity 3, a cylinder 4, a supply head 5, a slurry-supply pipe 6, a plate 7, a slide plate 8, a supply head body 9, a slurry-supply means 10, a pipe 11, a control apparatus 12, a slurry tank 13.

Figure 7:
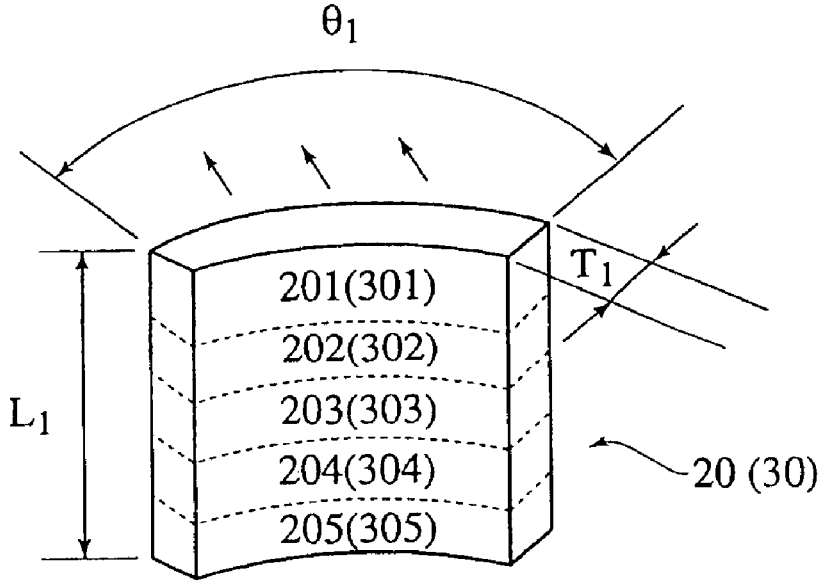
FIG. 7 is a perspective view showing one example of the arc segment magnet of the present invention having parallel anisotropy.

The slurry prepared in EXAMPLE 1 was charged into the tank 13. Lowered by a cylinder (not shown), the slurry-supply pipe 6 was stopped at a position near a bottom surface of the arc-segment-shaped cavity 3 (at a position near an upper surface of the lower punch 2). While elevating the slurry-supply pipe 6 to an upper end of the cavity 3 by a cylinder (not shown), a pump 10 was operated to discharge a predetermined amount of a slurry from the tank 13 through the pipe 11 and the slurry-supply pipe 6 into the cavity 3. After withdrawing the slurry-supply pipe 6 from the cavity 3, the supply head body 9 was moved leftward by the cylinder 4. While applying an orientation magnetic field of 1.0 MA/m (13 kOe) horizontally, compression molding in a transverse magnetic field was carried out under pressure of 98 MPa (1 ton/cm$^2$) by moving an upper punch (not shown) and the lower punch 2, to form an arc-segment-shaped green body 20 having a shape shown in FIG. 7. A portion 201 of the green body 20 is on the side of the upper punch. The direction of an orientation magnetic field applied was substantially in a perpendicular direction (shown by the arrow) to the paper plane of FIG. 7, thereby providing the green body 20 with parallel anisotropy.

The green body 20 was divided into five pieces (Nos. 201–205) along dotted lines, to measure ρg. of each piece. The measurement results are shown in Table 2. It is clear from Table 2 that the green body 20 had ρg of more than 4.50 g/cm$^3$ with a good ρg distribution that difference between the maximum and minimum ρg was less than 0.2 g/cm$^3$.

Subsequently, the green body 20 was subjected to oil removal in the same manner as in EXAMPLE 1, and then sintered and heat-treated. By machining until an as-sintered skin was removed, a thin, long R-T-B-based, sintered arc segment magnet having a thickness $T_1$, of 2.8 mm, a length $L_1$ of 80.0 mm and an center angle θ1 of 45° was obtained. This sintered arc segment magnet showed as small a shrinkage ratio as 25.5% in an anisotropy-providing direction, and warpage in an $L_1$ direction measured at a center of the sintered arc segment magnet on the outer periphery side was as small as less than 1 mm, indicating that the orientation $Br/4\pi I_{max}$ in an anisotropy-providing direction was well maintained.

With respect to an arc segment magnet obtained by machining each sintered body to a predetermined shape, magnetic properties in a magnetic anisotropy-providing direction were measured at room temperature (20° C.). As a result, the orientation $Br/4\pi I_{max}$ was as high as 96.9%, iHc was as high as 1.23 MA/m (15.4 kOe), and $(BH)_{max}$ was as high as 396.4 kJ/m$^3$ (49.8 MGOe). Also, the density was 7.60 g/cm$^3$, the oxygen content was 0.14 weight %, the carbon content was 0.06 weight %, and the nitrogen content was 0.02 weight %. Further, like the sample of EXAMPLE 1, X-ray diffraction measurement revealed that I(105)/I(006) was 0.65.

EXAMPLE 8

A thin, long, sintered arc segment magnet having a length $L_1$, a thickness $T_1$, and $\theta_1$ shown in Table 3 was produced in the same manner as in EXAMPLE 7 except for changing the thickness of the cavity 3 and the amount of a slurry filled. These magnets had such high magnetic properties, such as orientation $Br/4\pi I_{max}$ in a magnetic anisotropy-providing direction=96.9%, iHc=1.22–1.23 MA/m (15.3–15.4 kOe), and $(BH)_{max}$=395.6–396.4 kJ/m$^3$ (49.7–49.8 MGOe). They also had density of 7.60 g/cm$^3$, an oxygen content of 0.13–0.14 weight %, a carbon content of 0.06 weight % and a nitrogen content of 0.02–0.03 weight %. As a result of X-ray diffraction measurement as in EXAMPLE 1, I(105)/I(006) was 0.65–0.67.

Comparative Example 3

Attempt was made to produce a green body for an R-T-B-based, sintered arc segment magnet having T=1.0–4.0 mm by a molding method in a transverse magnetic field in the same manner as in EXAMPLE 8 except for using the slurry of COMPARATIVE EXAMPLE 1. However, cracking took place in the green body, failing to obtain a good green body free from cracks. Therefore, a portion of the cracked green body 30 (FIG. 7) in which there were no cracks was divided into five pieces (Nos. 301–305), and each piece was measured with respect to density. A ρg distribution thus obtained is shown in Table 2. It is clear from Table 2 that ρg distribution of COMPARATIVE EXAMPLE 3 was more uneven and smaller than those of EXAMPLE 7.

Five divided green bodies were subjected to oil removal and sintering. As a result of measurement of the resultant sintered bodies, a shrinkage ratio in an anisotropy-providing direction was 30.9%, about 5% larger than in EXAMPLE 7. After heat-treating and machining the sintered bodies in the same manner as in EXAMPLE 8, their magnetic properties in a magnetic anisotropy-providing direction were measured. As a result, $Br/4\pi I_{max}$=95.0%, iHc=1.23 MA/m (15.4 kOe), and $(BH)_{max}$=376.5 kJ/m$^3$ (47.3 MGOe), indicating that $Br/4\pi I_{max}$ and $(BH)_{max}$ of COMPARATIVE EXAMPLE 3 were smaller than those of EXAMPLES 7 and 8.

TABLE 2

| No. | Piece No. | Density (g/cm$^3$) |
|---|---|---|
| Ex. 7 | 201 | 4.69 |
| | 202 | 4.60 |
| | 203 | 4.56 |
| | 204 | 4.53 |
| | 205 | 4.59 |
| Com. | 301 | 4.13 |
| Ex. 3 | 302 | 3.98 |
| | 303 | 3.92 |
| | 304 | 4.01 |
| | 305 | 4.17 |

TABLE 3

| No. | $L_1$ (mm) | $T_1$ (mm) | $\theta_1$ (°) |
|---|---|---|---|
| Ex. 8 | 70 | 1.0 | 50 |
| | 2.1 | | |
| | 4.0 | | |

EXAMPLE 9

Radial Ring

Coarse powder (under 320 mesh) of an R-T-B-based alloy comprising 21.4 weight % of Nd, 6.0 weight % of Pr, 3.1 weight % of Dy, 1.05 weight % of B, 0.08 weight % of Ga, 2.0 weight % of Co, based on the total weight of the alloy, the balance being substantially Fe and inevitable impurities was pulverized by a jet mill in an Ar atmosphere having an oxygen concentration of 1 ppm by volume or less. The resultant fine powder having an average particle size of 4.0 μm was directly introduced into a mineral oil (tradename "Idemitsu Supper Sol PA-30" available from Idemitsu Kosan Co., Ltd.) containing an aliphatic acid ester of glycerol (oleic acid monoglyceride, tradename "Emasol MO-50" available from Kao Corp.) in the Ar atmosphere without contact with the air, to form a slurry. The resultant slurry had a composition of 71 parts by weight of fine alloy powder, 28.9 parts by weight of mineral oil, and 0.1 parts by weight of the aliphatic acid ester of glycerol.

Figure 12:
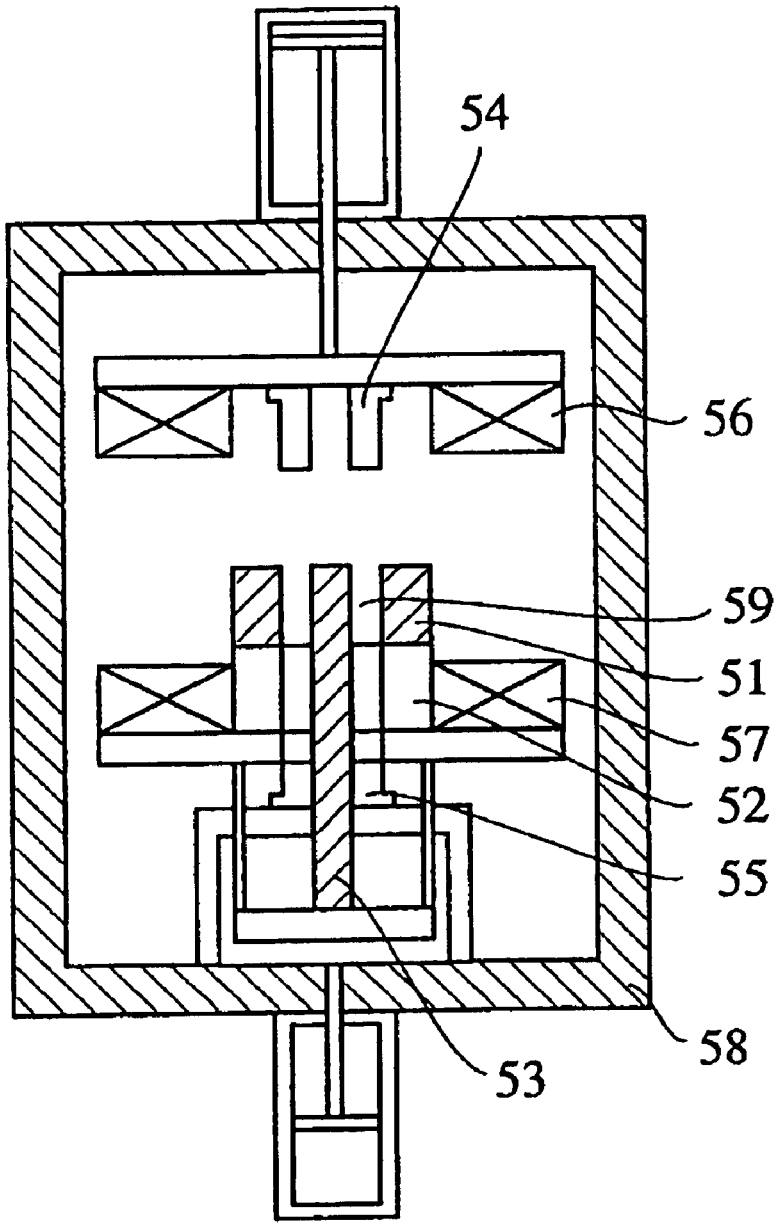
FIG. 12 is a partial cross-sectional view showing one example of a molding apparatus used in the present invention.

The slurry was charged into a cavity 59 (inner diameter of dies 51 and 52: 60 mm, outer diameter of core 53: 45 mm, length of ferromagnetic die part 51: 34 mm, and charge depth: 34 mm) of a molding die shown in FIG. 12, to carry out molding in a radial orientation magnetic field of about 238.7 KA/m (3 kOe) under molding pressure of 78.4 MPa (0.8 ton/cm$^2$), thereby producing a green body. In FIG. 12, 54 denotes an upper punch, 55 a lower punch, 56 an upper coil, 57 a lower coil, and 58 a press frame.

The green body was heated at 200° C. for 1 hour at a vacuum degree of about 66.5 Pa ($5\times10^{-1}$ Torr) to remove oil. It was then sintered at 1060° C. for 2 hours at a vacuum degree of about 4.0×10−3 Pa (about $3\times10^{-5}$ Torr), and then cooled to room temperature. The resultant sintered body was subjected to a heat treatment comprising heating at 900° C. for 1 hour in an Ar atmosphere, cooling to 550° C., keeping at 550° C. for 2 hours, and then cooling to room temperature. After machining the heat-treated, sintered magnet to a predetermined size, an epoxy resin coating was applied to the sintered body at an average thickness of 20 μm by an electrodeposition method, to provide a radially anisotropic, radial ring 70 of 48 mm in outer diameter, 39 mm in inner diameter and 11 mm in height (FIG. 13).

Figure 13A:
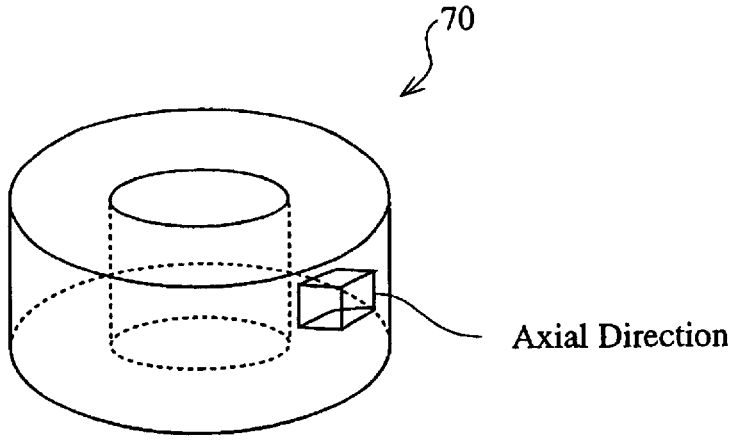
FIG. 13(a) is a perspective view showing how a sample is cut out of the radial ring of the present invention.
Figure 13B:
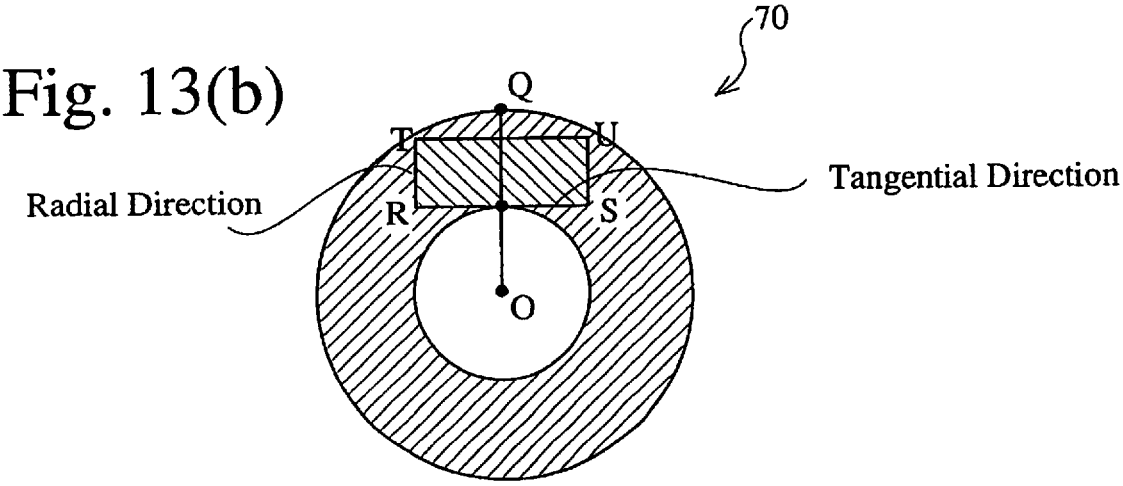
FIG. 13(b) is a cross-sectional view taken along the line A—A in FIG. 13(a)

As shown in FIGS. 13(a) and (b), a rectangular parallelepiped body of 5 mm in a tangential direction, 6.5 mm in an axial direction and 2.8 mm in a radial direction was cut out of an arbitrary portion of the radial ring 70 by a method shown in FIG. 13(b). In FIG. 13(b), an RS (TU) direction is a tangential direction of the radial ring 70, and an RT (SU) direction is a radial direction of the radial ring 70. Four rectangular parallelepiped bodies cut out of the radial ring 70 were bonded together such that their tangential directions and radial directions were aligned, to form a laminate.

Each rectangular parallelepiped body was measured with respect to a residual magnetic flux density Br// in a radial direction, a coercivity iHc, a maximum energy product $(BH)_{max}$ and a squareness ratio Hk/iHc at room temperature (20° C.). Hk is the value of H corresponding to 0.9 Br in the second quadrant of a 4πI-H curve, wherein 4πI is the intensity of magnetization, and H is the intensity of a magnetic field. The squareness ratio Hk/iHc indicates the rectangularity of the 4πI-H demagnetization curve. After measuring the residual magnetic flux density Br of the rectangular parallelepiped body in an axial direction at room temperature (20° C.), the orientation of the radial ring defined by [Br///(Br//+Br)]×100 (%) was calculated. The density of the radial ring was also measured. These measurement results are shown in Table 4. The radial ring contained 0.14 weight % of oxygen, 0.05 weight % of carbon and 0.003 weight % of nitrogen.

Comparative Example 4

A radial ring was produced in the same manner as in EXAMPLE 9 except for using a slurry not containing an aliphatic acid ester of glycerol, to evaluate magnetic properties. The results are shown in Table 4.

EXAMPLES 10, 11

Radial rings were produced in the same manner as in EXAMPLE 9 except for using a nonionic surfactant (polyoxyethylene allyl amine, tradename "Amiet 105," available from Kao Corp.) in EXAMPLE 10, and a nonionic surfactant (sorbitan trioleate, tradename "Rheodol SP-O30," available from Kao Corp.) in EXAMPLE 11 to measure their magnetic properties. The results are shown in Table 4. The radial ring contained 0.15 weight % of oxygen, 0.06 weight % of carbon and 0.002–0.003 weight % of nitrogen.

EXAMPLES 12, 13

Radial rings were produced in the same manner as in EXAMPLE 9 except for using an anionic surfactant (special macromolecular surfactant, tradename "Homogenol L-95," available from Kao Corp.) in EXAMPLE 12, and an anionic surfactant (special polycarboxylic acid-type, macromolecular surfactant, tradename "Homogenol L-18," available from Kao Corp.) in EXAMPLE 13, to measure their magnetic properties. The results are shown in Table 4. The radial ring contained 0.15–0.16 weight % of oxygen, 0.06 weight % of carbon and 0.003–0.004 weight % of nitrogen.

Comparative Example 5

Coarse alloy powder (under 320 mesh) comprising 23.6 weight % of Nd, 6.3 weight % of Pr, 1.9 weight % of Dy, 1.05 weight % of B, 0.08 weight % of Ga, 2.0 weight % of Co, based on the total weight of the alloy, the balance being substantially Fe and inevitable impurities was pulverized by a jet mill in a nitrogen gas atmosphere having an oxygen concentration of 0.1% by volume. The resultant fine powder (dry powder) having an average particle size of 4.0 μm was charged into a cavity 59 of a molding die shown in FIG. 12, to carry out dry compression molding in a radial orientation magnetic field of about 238.7 KA/m (3 kOe) under molding pressure of 78.4 MPa (0.8 ton/cm$^2$), thereby producing a radially anisotropic green body. After sintering it at 1080° C. for 2 hours at a vacuum degree of about $4.0\times10^{-3}$ Pa (about $3\times10^{-5}$ Torr), it was cooled to room temperature. The resultant sintered body was subjected to heat treatment, machining, and epoxy resin coating in the same manner as in EXAMPLE 9 to obtain a radial ring of Comparative Example 5. This radial ring was measured with respect to density and magnetic properties. The results are shown in Table 4.

TABLE 4

| No. | Surfactant | Density (g/cm$^3$) | Br// (T) (kG) | Br (T) (kG) | iHc (MA/m) (kOe) | $(BH)_{max}$ (kJ/m$^3$) (MGOe) | Hk/iHc (%) | Orientation (%) |
|---|---|---|---|---|---|---|---|---|
| Ex. 9 | Oleic Acid Monoglyceride | 7.60 | 1.30<br>13.0 | 0.14<br>1.43 | 1.42<br>17.9 | 320.0<br>40.2 | 96.3 | 90.1 |
| Ex. 10 | Polyoxyethylene Alkyl Amine | 7.60 | 1.31<br>13.1 | 0.13<br>1.33 | 1.44<br>18.1 | 318.4<br>40.0 | 96.2 | 90.8 |
| Ex. 11 | Sorbitan Trioleate | 7.61 | 1.28<br>12.8 | 0.16<br>1.63 | 1.40<br>17.6 | 309.6<br>38.9 | 95.5 | 88.7 |
| Ex. 12 | Special Macro-molecular Surfactant | 7.61 | 1.26<br>12.6 | 0.18<br>1.78 | 1.38<br>17.3 | 295.3<br>37.1 | 90.4 | 87.6 |
| Ex. 13 | Polycarboxylic Acid-Type Surfactant* | 7.60 | 1.26<br>12.6 | 0.18<br>1.83 | 1.34<br>16.8 | 289.7<br>36.4 | 88.5 | 87.3 |
| Com. Ex. 4 | No | 7.61 | 1.23<br>12.3 | 0.21<br>2.14 | 1.43<br>18.0 | 281.0<br>35.3 | 87.1 | 85.2 |
| Com. Ex. 5 | No | 7.56 | 1.21<br>12.1 | 0.24<br>2.41 | 1.29<br>16.2 | 369.8<br>33.9 | 70.2 | 83.4 |

Note
*Special polycarboxylic acid-type, macromolecular surfactant.

As is clear from EXAMPLES 9–13 and COMPARATIVE EXAMPLES 4 and 5 in Table 4, the method of the present invention can produce radial rings having much higher magnetic properties than those of the conventional radial rings, specifically a density of 7.56 g/cm$^3$ or more, Br// in a radial direction of 1.25 T (12.5 kG) or more, iHc of 1.1 MA/m (14 kOe) or more, $(BH)_{max}$ of 282.6 kJ/m$^3$ (35.5 MGOe) or more, Hk/iHc of 87.5% or more, Br in an axial direction of 0.2 T (2.0 kG) or less, and an orientation in a radial direction of 85.5% or more.

EXAMPLE 14

Four radially anisotropic, ring-shaped green bodies having the same size as that of EXAMPLE 9 were produced in the same manner as in EXAMPLE 9. These four green bodies were aligned with their flat surfaces adhered to each other, and placed on a bottom surface of a cavity 59 shown in FIG. 12 such that their flat bottom surface was in contact with the bottom surface of the cavity 59. Compression molding was carried out under the conditions of molding pressure of 98 MPa (1.0 ton/cm$^2$) without a magnetic field, to obtain an integrally laminated green body consisting of the above four green bodies. This laminated green body was sintered in the same manner as in EXAMPLE 9 to produce a radial ring 90 of 47 mm in outer diameter, 38 mm in inner diameter and 43 mm in height. This radial ring contained 0.16 weight % of oxygen, 0.05 weight % of carbon and 0.004 weight % of nitrogen.

Figure 14A:
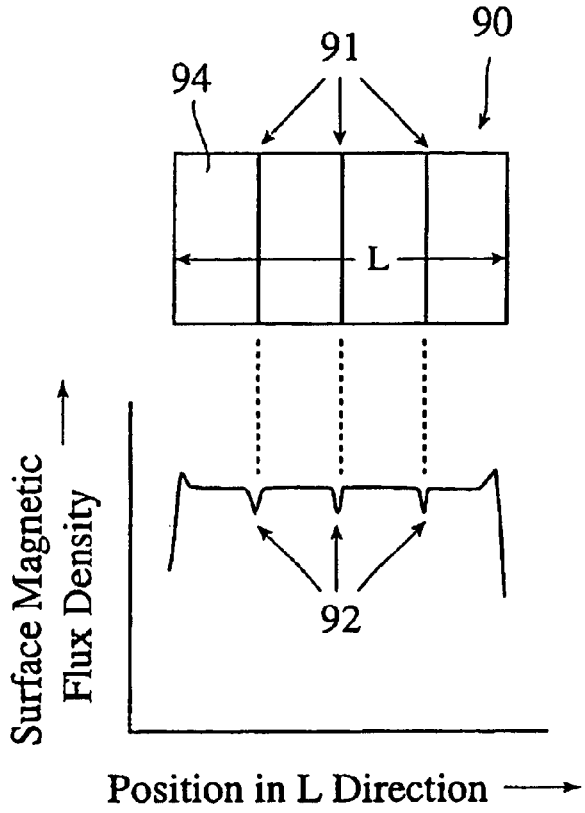
FIG. 14(a) is a view showing the magnetic flux density distribution on the surface of the radial ring of the present invention having sintering-bonded portions.
Figure 14B:
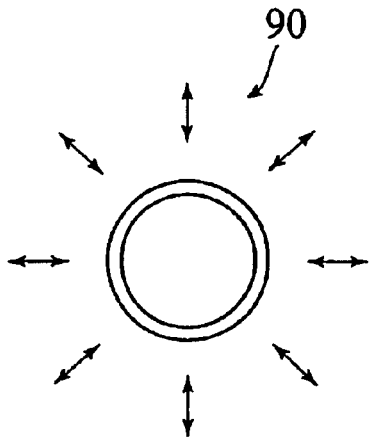
FIG. 14(b) is a view showing the radial anisotropy of the radial ring of FIG. 14(a).

As shown in FIG. 14, this radial ring 90 had portions 91 bonded by sintering, which corresponded to boundaries between adjacent green bodies. A drop 92 (usually about 0.005 T)was observed in a surface magnetic flux density distribution at positions corresponding to the bonded portions 91. Rectangular parallelepiped bodies were cut out of non-bonded portions 94 of the radial ring 90 in the same manner as in EXAMPLE 9, to measure density and magnetic properties in a radial direction (orientation, etc.). The results are shown in Table 5.

Comparative Example 6

Four radially anisotropic, ring-shaped green bodies having the same size were produced in the same manner as in COMPARATIVE EXAMPLE 4. Radial rings of 46 mm in outer diameter, 37 mm in inner diameter and 41 mm in height having portions bonded by sintering were produced in the same manner as in EXAMPLE 14 except for using these four green bodies. Rectangular parallelepiped bodies were cut out of non-bonded portions of this radial ring to measure density and magnetic properties. The results are shown in Table 5.

TABLE 5

| No. | Surfactant | Density (g/cm$^3$) | Br// (kT) (kG) | Br (kT) (kG) | iHc (MA/m) (kOc) | $(BH)_{max}$ (kJ/m$^3$) (MGOc) | (Hk/iHc) (%) | Orientation (%) |
|---|---|---|---|---|---|---|---|---|
| Ex. 14 | Oleic Acid | 7.61 | 1.29 | 0.14 | 1.43 | 319.2 | 96.0 | 90.1 |
| | Monoglyceride | | 12.9 | 1.42 | 18.0 | 40.1 | | |
| Com. | No | 7.60 | 1.22 | 0.23 | 1.44 | 278.6 | 86.6 | 84.1 |
| Ex. 5 | | | 12.2 | 2.31 | 18.1 | 35.0 | | |

It is clear from Table 5 that the radial ring of EXAMPLE 14 has higher radial orientation, $(BH)_{max}$ and Hk/iHc than the radial ring of COMPARATIVE EXAMPLE 6.

Figure 10:
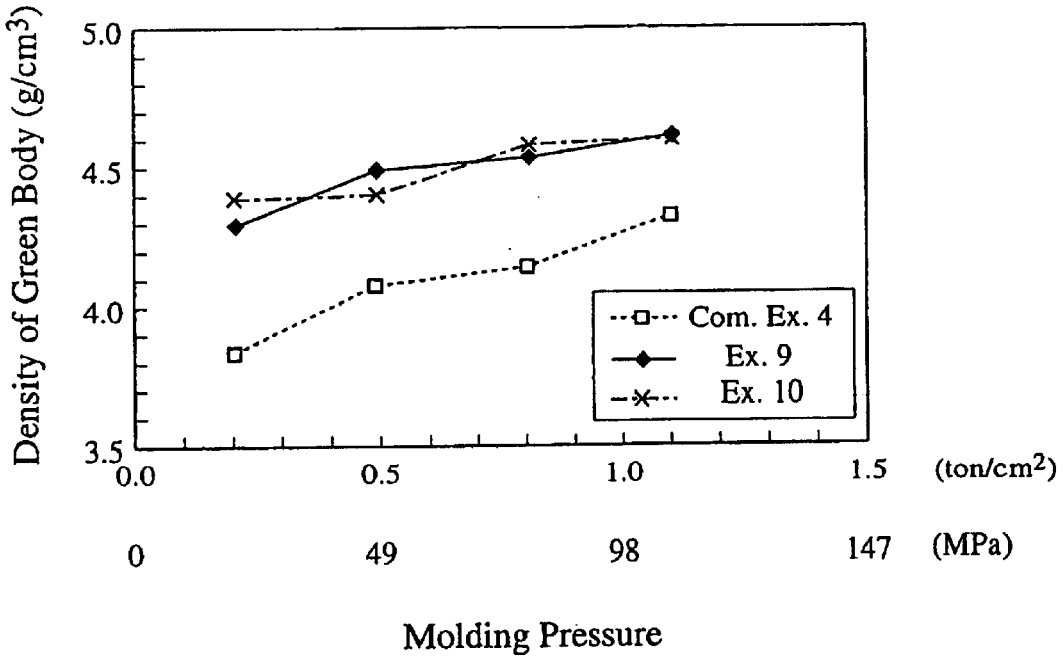
FIG. 10 is a graph showing the relation between the density of a green body for a radial ring and the molding pressure.

FIG. 10 shows the change of density in radially anisotropic green bodies when molding pressure varies in EXAMPLES 9 and 10 and COMPARATIVE EXAMPLE 4. FIG. 10 verifies that the green bodies of EXAMPLES 9 and 10 have higher density than that of COMPARATIVE EXAMPLE 4. This indicates that the addition of a surfactant improves the filling of a slurry. Incidentally, green bodies produced under molding pressure of less than 49 MPa (0.5 ton/cm$^2$) in COMPARATIVE EXAMPLE 4 had extremely low density with uneven distribution, and sintered bodies formed from such green bodies were subjected to drastic deformation, resulting in as low a radial orientation as less than 80.0%.

Figure 11:
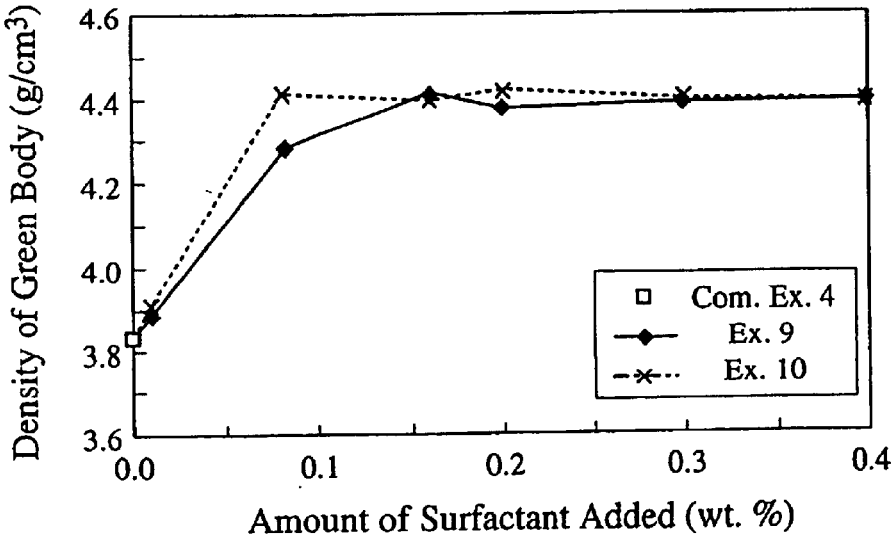
FIG. 11 is a graph showing the relation between the density of a green body for a radial ring and the amount of a surfactant added to a slurry.

FIG. 11 shows the change of density in radially anisotropic green bodies when the amount of a surfactant (fine powder+surfactant=100 weight %) varies in EXAMPLES 9 and 10 and COMPARATIVE EXAMPLE 4. FIG. 11 verifies that the density of green bodies increases in proportion to the amount of a surfactant, though it becomes almost saturated when the amount of a surfactant reaches 0.2 weight %. It also verifies that the radial orientation is high when the amount of a surfactant is 0.01–0.3 weight %. When the amount of a surfactant exceeds 0.3 weight %, iHc decreases drastically. On the other hand, when the amount of a surfactant is less than 0.01 weight %, effects of adding a surfactant cannot be obtained. Thus, the amount of the surfactant is 0.01–0.3 weight %, preferably 0.01–0.2 weight

EXAMPLE 15

Oil removal, sintering, heat treatment, machining and surface treatment were conducted in this order in the same manner as in EXAMPLE 9 except for changing the inner diameter and outer diameter of a ring-shaped green body [outer diameter=inner diameter+(8–20 mm)] and $H_{ap}$, to form a radial ring having an inner diameter shown in Table 6. A radial orientation magnetic field $H_{ap}$, an inner diameter and radial orientation (%) of each radial ring are shown in Table 6. Hap decreases as the inner diameter of the radial ring decreases. When the inner diameter of the radial ring was 100 mm, the upper limit of $H_{ap}$ was 716.2 KA/m (9 kOe) by heat generated from a power supply and a coil for generating a magnetic field.

Any of radial rings of EXAMPLE 15 had high radial orientation. Also, any radial rings had squareness ratios Hk/iHc of more than 87.5% and iHc of more than 1.1 MA/m (14.0 kOe). Incidentally, the radial ring contained 0.15–0.16 weight % of oxygen, 0.05–0.06 weight % of carbon and 0.003–0.004 weight % of nitrogen.

COMPARATIVE EXAMPLE 7

Radial rings shown in Table 6 were produced in the same manner as in EXAMPLE 15 except for using the slurry of COMPARATIVE EXAMPLE 4 to measure their radial orientation.

TABLE 6

| $H_{ap}$ (kA/m) | $H_{ap}$ (kOc) | Inner Diameter of Radial Ring (mm) | Orientation (%) Ex. 15 | Orientation (%) Com. Ex. 7 |
|---|---|---|---|---|
| 716.2 | 9 | 100 | 93.0 | 85.3 |
| 636.6 | 8 | 50 | 92.9 | 85.1 |
| 453.6 | 5.7 | 30 | 91.8 | 85.0 |
| 270.6 | 3.4 | 10 | 90.2 | 84.9 |

It is clear from Table 6 that the present invention can produce high-performance radial rings of 100 mm or less in inner diameter with excellent orientation.

EXAMPLE 16

Figure 8:
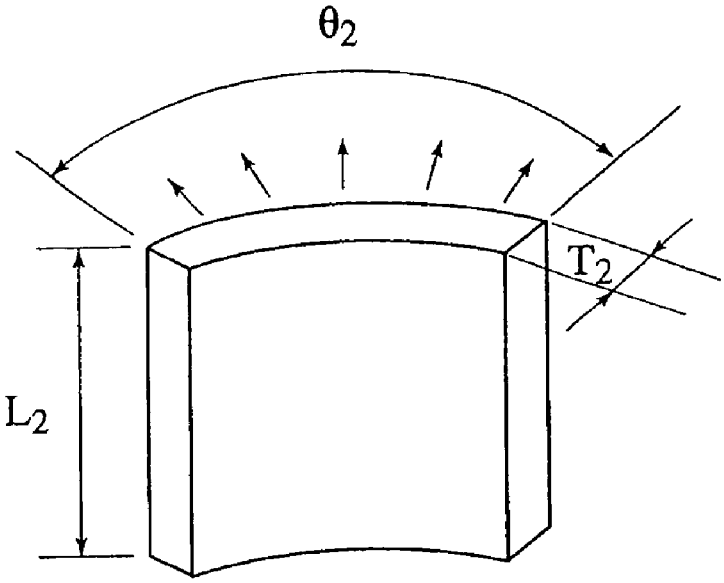
FIG. 8 is a perspective view showing one example of the arc segment magnet of the present invention having radial anisotropy.

Sintered arc segment magnets as shown in FIG. 8 each having a length $L_2$ of 70 mm, a thickness $T_2$ of 2.5 mm, $\theta_2$ of 40° and an inner diameter shown in Table 7 were produced in the same manner as in EXAMPLE 8 except for changing molding conditions and the sizes of a green bodies.

TABLE 7

| Inner diameter of Arc Segment Magnet (mm) | $H_{ap}$ (kA/m) | $H_{ap}$ (kOc) | Orientation (%) |
|---|---|---|---|
| 100 | 708.3 | 8.9 | 93.1 |
| 50 | 612.8 | 7.7 | 92.6 |
| 30 | 461.6 | 5.8 | 92.2 |
| 10 | 310.4 | 3.9 | 92.0 |

It is clear from Table 7 that the sintered arc segment magnets of EXAMPLE 16 had high orientation in a radial direction. They had squareness ratios Hk/iHc of more than 87.5% and iHc of more than 1.1 MA/m (14 kOe). Also, the arc segment magnets contained 0.14–0.16 weight % of oxygen, 0.05–0.06 weight % of carbon and 0.003–0.004 weight % of nitrogen.

Comparative Example 8

Though attempt was made to form arc-segment-shaped green bodies in the same manner as in EXAMPLE 16 except for using the slurry of COMPARATIVE EXAMPLE 4, cracking took place. Accordingly, sintered arc segment magnets could not be produced.

Though molding in a transverse magnetic field or in a radial magnetic field has been described in the above EXAMPLES, molding in a vertical magnetic field can also be used to produce arc segment magnets with better orientation $Br/4\pi I_{max}$ in anisotropy-providing direction than that of conventional arc segment magnets. Also, radial rings and arc segment magnets with improved radial orientation can be produced.

The present invention can produce arc-segment-shaped or ring-shaped R-T-B sintered magnets having low oxygen content and high density and orientation while preventing the cracking of green bodies, as compared with the methods for producing rare earth sintered magnets using conventional oil. Because shrinkage ratio and deformation can be suppressed in the course from green bodies to sintered bodies by the present invention, arc-segment-shaped or ring-shaped, sintered magnets with near-net shape and high orientation can be obtained.

What is claimed is:

1. A thin arc segment magnet having a thickness of 1–4 mm and made of [a] *an R-T-B-based,* rare earth sintered magnet having a main component composition comprising 28–33 weight % of R and 0.8–1.5 weight % of B, the balance being substantially [Fe] *T*, wherein R is at least one rare earth element including Y, and T is Fe or Fe and Co, said arc segment magnet having an oxygen content of 0.3 weight % or less, *a carbon content of 0.10 weight % or less and a nitrogen content of 0.15 weight % or less* based on the total weight of the magnet, a density of 7.56 g/cm$^3$ or more, a coercivity iHc of 1.1 MA/m (14 kOe) or more at room temperature, and an orientation $Br/4\pi I_{max}$ of 96% or more in an anisotropy-providing direction at room temperature, *Br being a residual magnetic flux density, and $4\pi I_{max}$ being a maximum value of $4\pi I$ in a curve of $4\pi I$-H curve, wherein $4\pi I$ is the intensity of magnetization, and H is the intensity of a magnetic field.*

2. The arc segment magnet according to claim 1, having parallel anisotropy.

3. The arc segment magnet according to claim 1, having an axial length of 40–100 mm.

4. The arc segment magnet according to claim 1, having a ratio I(105)/I(006) of 0.5–0.8, wherein I(105) represents the intensity of an X-ray diffraction peak from a (105) plane, and I(006) represents the intensity of an X-ray diffraction peak from a (106) plane.

5. A radially anisotropic, arc segment magnet having an inner diameter of 100 mm or less and made of [a] *an R-T-B-based,* rare earth sintered magnet having a main component composition comprising 28–33 weight % of R and 0.8–1.5 weight % of B, the balance being substantially [Fe] *T*, wherein R is at least one rare earth element including Y, and T is Fe or Fe and Co, said arc segment magnet having an oxygen content of 0.3 weight % or less, *a carbon content of 0.10 weight % or less and a nitrogen content of 0.15 weight % or less* based on the total weight of the magnet, a density of 7.56 g/cm$^3$ or more, a coercivity iHc of 1.1 MA/m (14 kOe) or more at room temperature, and an orientation $[Br///(Br//+Br\perp)]\times 100$ (%) of 85.5% or more at room temperature, said orientation being defined by a residual magnetic flux density Br// in a radial direction and a residual magnetic flux density Br⊥ in an axial direction perpendicular to said radial direction.

6. The arc segment magnet according to claim 5, wherein it is as thin as 1–4 mm.

7. The arc segment magnet according to claim 5, wherein it is as long as 40–100 mm in an axial direction.

8. A radially anisotropic ring magnet having an inner diameter of 100 mm or less and made of [a] *an R-T-B-based,* rare earth sintered magnet having a main component composition comprising 28–33 weight % of R and 0.8–1.5 weight % of B, the balance being substantially [Fe] *T*, wherein R is at least one rare earth element including Y, and T is Fe or Fe and Co, said ring magnet having an oxygen content of 0.3 weight % or less, *a carbon content of 0.10 weight % or less and a nitrogen content of 0.15 weight % or less* based on the total weight of the magnet, a density of 7.56 g/cm$^3$ or more, a coercivity iHc of 1.1 MA/m (14 kOe) or more at room temperature, and an orientation $[Br///(Br//+Br\perp)]\times 100$ (%) of 85.5% or more at room temperature, said orientation being defined by a residual magnetic flux density Br// in a radial direction and a residual magnetic flux density Br⊥ in an axial direction perpendicular to the radial direction.

9. The ring magnet according to claim 8, having portions bonded by sintering.

10. A method for producing [a] *an R-T-B-based,* rare earth sintered magnet *having a main component composition comprising 28–33 weight % of R and 0.8–1.5 weight % of B, the balance being substantially T, wherein R is at least one rare earth element including Y, and T is Fe or Fe and Co, said rare earth sintered magnet having an oxygen content of 0.3 weight % or less, a carbon content of 0.10 weight % or less and a nitrogen content of 0.15 weight % or less based on the total weight of the magnet, a density of 7.56 g/cm$^3$ or more, and a coercivity iHc of 1.1 MA/m or more at room temperature, said method* comprising the steps of finely pulverizing an alloy for said *R-T-B-based,* rare earth sintered magnet to an average particle size of 1–10 μm in a non-oxidizing atmosphere; introducing the resultant fine powder into a mixture liquid comprising 99.7–99.99 parts by weight of at least one oil selected from the group consisting of a mineral oil, a synthetic oil and a vegetable oil and 0.01–0.3 parts by weight of a nonionic surfactant and/or an anionic surfactant; subjecting the resultant slurry mixture to molding in a magnetic field; and carrying out oil removal, sintering and heat treatment in this order.

11. The method for producing [a] *an R-T-B-based,* rare earth sintered magnet according to claim 10, wherein the molding in a magnetic field is compression molding, and the compressed green body preferably has a density distribution of 4.3–4.7 g/cm$^3$ to provide [a] *an R-T-B-based,* rare earth sintered magnet having a main phase composed of an $R_2T_{14}B$ intermetallic compound[, wherein R is at least one rare earth element including Y, and T is Fe or Fe and Co].

12. A method for producing a thin arc segment magnet having a thickness of 1–4 mm and made of [a] *an R-T-B-based,* rare earth sintered magnet having a main component composition comprising 28–33 weight % of R and 0.8–1.5 weight % of B, the balance being substantially [Fe] *T*, wherein R is at least one rare earth element including Y, and T is Fe or Fe and Co, said arc segment magnet having an oxygen content of 0.3 weight % or less, *a carbon content of 0.10 weight % or less and a nitrogen content of 0.15 weight % or less* based on the total weight of the magnet, a density of 7.56 g/cm$^3$ or more, a coercivity iHc of 1.1 MA/m (14 kOe) or more at room temperature, and an orientation $Br/4\pi I_{max}$ of 96% or more in an anisotropy-providing direction at room temperature, *Br being a residual magnetic flux density, and $4\pi I_{max}$ being a maximum value of $4\pi I$ in a curve of $4\pi I$-H curve, wherein $4\pi I$ is the intensity of magnetization, and H is the intensity of a magnetic field,* said method comprising the steps of finely pulverizing an alloy for said *R-T-B-based,* rare earth sintered magnet to an average particle size of 1–10 μm in a non-oxidizing atmosphere; introducing the resultant fine powder into a mixture liquid comprising 99.7–99.99 parts by weight of at least one oil selected from the group consisting of a mineral oil, a synthetic oil and a vegetable oil and 0.01–0.3 parts by weight of a nonionic surfactant and/or an anionic surfactant; subjecting the resultant slurry mixture to molding in a magnetic field; and carrying out oil removal, sintering and heat treatment in this order.

13. A method for producing a radially anisotropic, arc segment magnet having an inner diameter of 100 mm or less and made of [a] *an R-T-B-based,* rare earth sintered magnet having a main component composition comprising 28–33 weight % of R and 0.8–1.5 weight % of B, the balance being substantially [Fe] *T*, wherein R is at least one [of] rare earth [elements] *element* including Y, and T is Fe or Fe and Co, said arc segment magnet having an oxygen content of 0.3 weight % or less, *a carbon content of 0.10 weight % or less and a nitrogen content of 0.15 weight % or less* based on the total weight of the magnet, a density of 7.56 g/cm$^3$ or more, a coercivity iHc of 1.1 MA/m (14 kOe) or more at room temperature, and an orientation $[Br///(Br//+Br\perp)]\times 100$ (%) of 85.5% or more at room temperature, said orientation being defined by a residual magnetic flux density Br// in a radial direction and a residual magnetic flux density Br⊥ in an axial direction perpendicular to said radial direction, said method comprising the steps of finely pulverizing an alloy for said *R-T-B-based,* rare earth sintered magnet to an average particle size of 1–10 μm in a non-oxidizing atmosphere; introducing the resultant fine powder into a mixture liquid comprising 99.7–99.99 parts by weight of at least one oil selected from the group consisting of a mineral oil, a synthetic oil and a vegetable oil and 0.01–0.3 parts by weight of a nonionic surfactant and/or an anionic surfactant; subjecting the resultant slurry mixture to molding in a magnetic field; and carrying out oil removal, sintering and heat treatment in this order.

14. A method for producing a radially anisotropic ring magnet having an inner diameter of 100 mm or less and made of [a] *an R-T-B-based,* rare earth sintered magnet having a main component composition comprising 28–33 weight % of R and 0.8–1.5 weight % of B, the balance being substantially [Fe] *T*, wherein R is at least one rare earth element including Y, and T is Fe or Fe and Co, said ring magnet having an oxygen content of 0.3 weight % or less, *a carbon content of 0.10 weight % or less and a nitrogen content of 0.15 weight % or less* based on the total weight of the magnet, a density of 7.56 g/cm$^3$ or more, a coercivity iHc of 1.1 MA/m (14 kOe) or more at room temperature, and an orientation $[Br///(Br//+Br\perp)]\times 100$ (%) of 85.5% or more at room temperature, said orientation being defined by a residual magnetic flux density Br// in a radial direction and a residual magnetic flux density Br⊥ in an axial direction perpendicular to the radial direction, said method comprising the steps of finely pulverizing an alloy for said *R-T-B-based,* rare earth sintered magnet to an average particle size of 1–10 μm in a non-oxidizing atmosphere; introducing the resultant fine powder into a mixture liquid comprising 99.7–99.99 parts by weight of at least one oil selected from the group consisting of a mineral oil, a synthetic oil and a vegetable oil and 0.01–0.3 parts by weight of a nonionic surfactant and/or an anionic surfactant; subjecting the resultant slurry mixture to molding in a magnetic field; and carrying out oil removal, sintering and heat treatment in this order.

* * * * *